United States Patent [19]

Baumgaertner et al.

[11] 4,045,285
[45] Aug. 30, 1977

[54] PLANT FOR THE PRODUCTION OF HYDROGEN THROUGH UTILIZATION OF HEAT ENERGY OBTAINED FROM A GAS-COOLED NUCLEAR REACTOR

[75] Inventors: Heinrich Baumgaertner, Ketsch; Ekkehard Barchewitz, Mannheim, both of Germany

[73] Assignee: Hochtemperatur-Reactorbau GmbH., Mannheim, Germany

[21] Appl. No.: 634,052

[22] Filed: Nov. 21, 1975

[30] Foreign Application Priority Data

Nov. 23, 1974 Germany .............................. 2455508

[51] Int. Cl.² .............................................. G21D 9/00
[52] U.S. Cl. ......................................... 176/39; 176/60; 176/87; 423/248; 423/650
[58] Field of Search ..................... 176/38, 39, 60, 65, 176/87; 423/248, 650, 651

[56] References Cited

U.S. PATENT DOCUMENTS

| 3,115,449 | 12/1963 | Fortescue et al. | 176/60 |
| 3,371,017 | 2/1968 | Coast et al. | 176/87 |
| 3,535,082 | 10/1970 | Nurnberg et al. | 176/39 X |
| 3,558,047 | 1/1971 | Nurnberg et al. | 176/39 X |
| 3,649,451 | 3/1972 | Yedida et al. | 176/37 |
| 3,656,566 | 4/1972 | Coast et al. | 176/60 X |
| 3,802,993 | 4/1974 | von Fredersdorff et al. | 176/39 X |
| 3,897,838 | 8/1975 | Hosegood | 176/60 |
| 3,923,466 | 12/1975 | Seelig et al. | 176/39 X |

FOREIGN PATENT DOCUMENTS

| 1,116,479 | 6/1968 | United Kingdom | 176/39 |

*Primary Examiner*—Peter A. Nelson
*Attorney, Agent, or Firm*—Bacon & Thomas

[57] ABSTRACT

Disclosed is a plant for the production of hydrogen, preferably for the hydrogenating gasification of coal, through utilization of heat energy derived from a gas-cooled, high-temperature nuclear reactor, comprising:

a. a thick-walled pressure vessel;
b. a high temperature reactor contained in a centrally oriented cavity within the vessel;
c. a plurality of process gas cracking reactors contained within the wall of the vessel;
d. a number of steam generators corresponding to the number of gas cracking reactors, the generators being contained in the wall of the vessel;
e. a number of recuperative heat exchangers corresponding to the number of gas cracking reactors, each of the heat exchangers being contained in the wall of the vessel and being positioned closely adjacent one of the gas cracking reactors; and
f. a coaxial conduit connecting said adjacent heat exchanger and gas cracking reactor pairs.

1 Claim, 2 Drawing Figures

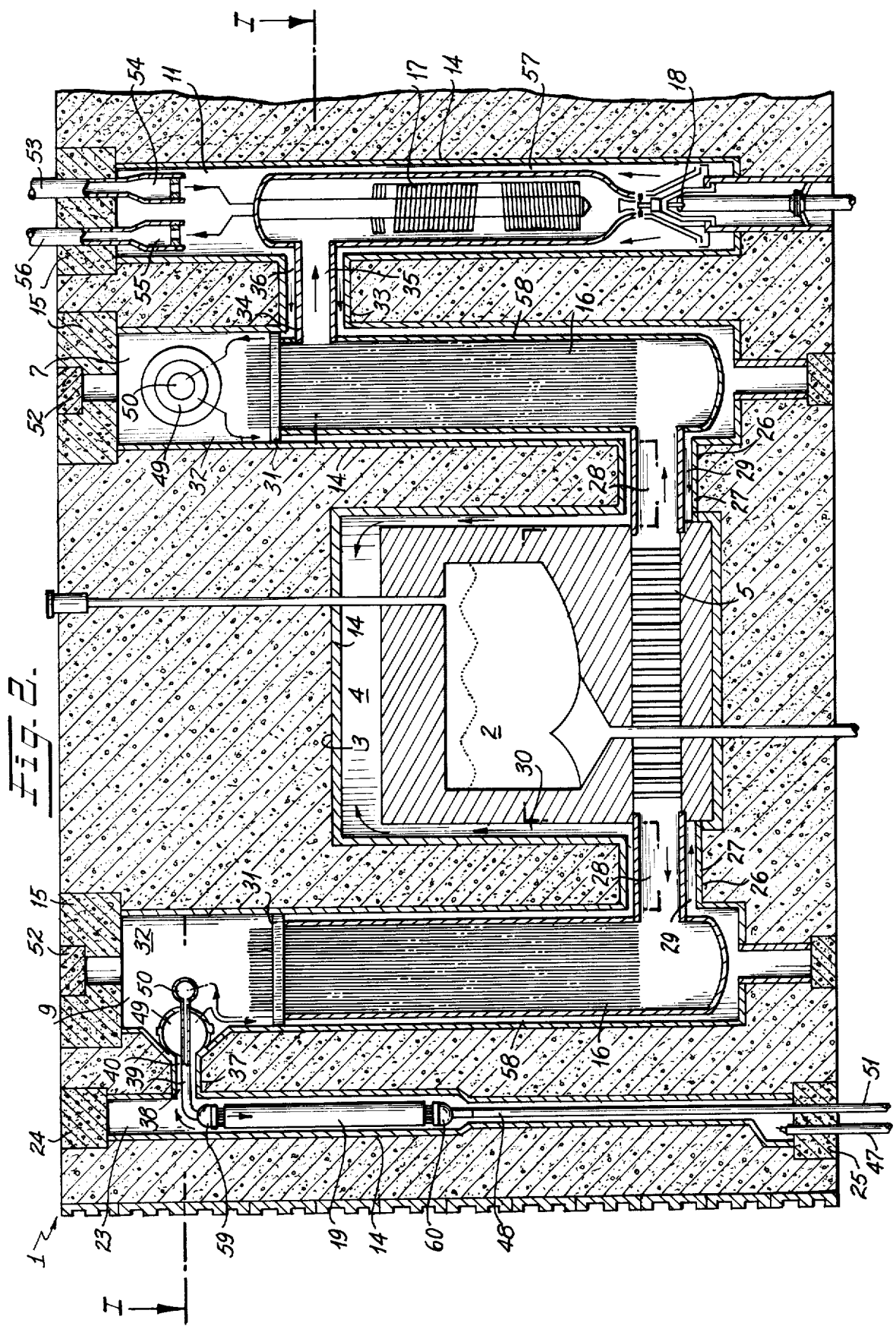

PLANT FOR THE PRODUCTION OF HYDROGEN THROUGH UTILIZATION OF HEAT ENERGY OBTAINED FROM A GAS-COOLED NUCLEAR REACTOR

BACKGROUND OF THE INVENTION

The present invention relates to an installation for the production of hydrogen, preferably for the hydrogenating gasification of coal, through utilization of heat energy obtained from a gas-cooled high-temperature nuclear reactor whereby the heat of the reactor is transferred by means of the cooling gas to a series of tubular cracking ovens and subsequently to a series of steam generating devices connected to the cracking ovens. The high-temperature reactor, the tubular cracking ovens and the steam generators are all installed in pods inside one common vessel made of reinforced concrete and recuperative heat exchanging devices are provided for the process gases passing through the tubular cracking oven in the gas circuit.

Nuclear power plants with closed gas-turbine circuits are conventionally designed according to the single-container construction method (single unit design) whereby the reactor, the gas turbine, the condenser and the heat exchangers are all installed inside one common pressure vessel made of reinforced concrete. Plants of such design have been shown in German Offenlegungsschriften Nos. 1,764,249, 2,062,934 and 2,241,426. These plants have in common that the energy produced in the reactor core is utilized to drive first a gas turbine and subsequently, electric generators. Also, proposals are extant whereby the energy absorbed by the cooling gas in the reactor core is transferred through a heat exchanger to a secondary circuit which is used for supplying the necessary ambient temperature. Such heat exchanger is likewise integrated inside the pressure vessel of reinforced concrete.

In German Auslegeschrift No. 1,933,695 the principle has been established by which the heat stored in the cooling medium of a nuclear reactor is transferred in a heat exchanger to a fluid heat-transfer medium — for example lead — which, in turn, passes the heat on to a secondary reaction device. Such heat exchangers and reaction devices are placed in a common housing, which is likewise installed, together with the nuclear reactor, inside a common pressure vessel.

The state of the art further provides for the use of heat energy absorbed by a rare gas heated by a nuclear reactor for the production of ethylene or synthesis gas by a thermal cracking of hydrocarbons by means of steam. Such a process is described in German Auslegeschrift No. 1,928,093. In the tubular cracking oven disclosed, the process gas entering the oven is first passed through a heat exchanger installed outside the oven, where the gas absorbs heat energy from a hot medium, such as the reactor's exhaust gases. Where such heat exchangers are designed as recuperative heat exchangers and are installed inside an explosion-proof steel pressure vessel, considerations concerning safety still require that the pressure vessel itself be installed inside the safety structure surrounding the entire plant. The installation of a tubular cracking oven inside the pressure vessel of stressed concrete presents, however, a number of technical and safety problems involving, for instance, the positioning of the connecting tubing between the cracking oven and the recuperative heat exchanger.

SUMMARY OF THE INVENTION

It is therefore the object of this invention to substantially reduce such problems through an optimal positioning of the elements comprising the recuperative heat exchanging units by providing a plant for the production of hydrogen, preferably for the hydrogenating gasification of coal.

This object has been accomplished according to the invention through utilization of heat energy derived from a gas-cooled, high-temperature nuclear reactor, comprising:

a. a thick-walled pressure vessel;
b. a high temperature reactor contained in a centrally oriented cavity within the vessel;
c. a plurality of process gas cracking reactors contained within the wall of the vessel;
d. a number of steam generators corresponding to the number of the gas cracking reactors, the generators being contained in the wall of the vessel;
e. a number of recuperative heat exchangers corresponding to the number of gas cracking reactors, each of the heat exchangers being contained in the wall of the vessel and being positioned closely adjacent one of the gas cracking reactors; and
f. a coaxial conduit connecting said adjacent heat exchanger and gas cracking reactor pairs.

The foregoing objective is attained through the present invention by installing the recuperative heat exchanging units likewise in cavities inside the concrete pressure vessel directly adjacent to their respective cracking ovens and by connecting these two components through a coaxial gas duct in which the colder gas flows on the shell side, surrounding the structural elements that are exposed to high temperatures.

By installing the recuperative heat exchangers inside the concrete pessure vessel according to the invention, it is possible to considerably reduce the length of the tubes connecting the heat exchangers to the tubular cracking ovens and also, make them easy to embed in the concrete vessel. The last feature is for safety reasons an absolute requirement applying to all tube systems that conduct cracking gases inside the containment. The connecting tubes are designed in the form of coaxial gas ducts in which the colder gas flows around the hot cracking gas carried by the interior pipes; as a result, the temperature stress on the liners which line the passageways for the coaxial gas ducts is greatly reduced.

Further essential advantages of the design disclosed here are:

1. that no additional separate splinter-proof steel pressure containers are needed;
2. that the dimensions of the safety vessel (containment) in which the pre-stressed concrete tank is conventionally installed, can be reduced in size, since in the new design no additional space is taken up by the recuperative heat exchangers.

The working gas, a mixture of methane and steam, which is to be moved into the tubular cracking ovens is first heated to approximately 650° C in the recuperative heat exchangers by the cracked gas passing out of the tubular cracking ovens with an exhaust temperature of approximately 820° C. During the passage, the cracked gas is cooled down to approximately 520° C (the temperature values cited depend upon the overall design of the entire plant and must be considered as approximations). The cracked gas exhausts from the concrete pressure vessel at the temperature mentioned. Because rapid closing safety valves are required, they can therefor be installed directly on the concrete pressure vessel, since the functioning of such valves is assured at a temperature of 520° C.

It is advantageous to design the tubes connecting the recuperative heat exchangers to a system for the hydrogenating gasification of coal in such a manner that the tubes come out of the concrete pressure vessel at the bottom, thereby substantially shortening the length of the tubing installed inside the pressure vessel (containment) and making the conduits easy to embed in the concrete vessel wall. Furthermore, the accessibility of the concrete pressure vessel either from the top of from the sides will not be reduced. The cold gas mixture is introduced into the recuperative heat exchangers through connecting tubes installed parallel to the ducts in which cracked gas is moved.

The tubular cracking ovens together with steam generators and recuperative heat exchangers are suitably installed in pods, symmetrically around the central cavity containing the high-temperature reactor in such a manner that they can be easily removed. A blower is installed underneath each steam generator. Whereas tubular cracking ovens, the steam generators, and the recuperative heat exchangers are removable from above, the relatively light weight blowers are removable from the bottom. Each component can thereby be removed independently.

The entire cooling gas circuit (primary circuit) is subdivided into several indentical loops, each comprising in series the same set of components: a tubular cracking oven, a steam generator, a blower, and a system of connecting tubes carrying the cooling gas. All loops are connected to each other only via the high-temprature reactor.

In addition to the basic components of the primary circuit integrated inside the stressed-concrete pressure vessel and the system comprising the recuperative heat exchangers, the plant furthermore comprises a set of components for the hydrogenating gasification of coal, and also a stream-turbine circuit comprising a plurality of components. Since the invention is concerned merely with the components installed in the interior of the concrete pressure vessel, a detailed description of these conventional external parts can be omitted.

The tubular cracking ovens, the steam generators and the recuperative heat exchangers are all installed in the concrete pressure vessel at such a level that they lay parallel to each other. As a result, it is possible to install in straight lines and in horizontal orientation the conduits conveying cooling gas and process gas between the several pods in each loop, and likewise also the tubes connecting the tubular cracking ovens with the reactor cavity. Straight, horizontal ducts afford the shortest connection between components. Thereby a substantial reduction in the build-up of heat in the concrete is attained. The pipes connecting the tubular cracking ovens with the recuperative heat exchangers in each circuit are installed above the support plates from which the tubular cracking ovens are suspended inside each pod. In the upper section of each tubular cracking oven and above the support plates a separate chamber is provided which is tightly sealed off from the remainder cracking oven by a packing medium; the chamber is filled with pure helium gas and held under higher compression that the cooling gas. Any radioactive contamination of this chamber is thereby absolutely prevented, and consequently, the couplings connecting the individual cracking tubes which are installed in this chamber, are accessible for purposes of replacement of the catalyst inside the cracking tubes.

The tubes conducting the cooling gas in each loop are advantageously designed as coaxial tubes whereby the colder gas is moving in each instance through the outer duct. The heated cooling gas streaming out of the reactor at the bottom, moves first through the radial hot-gas ducts which are part of a coaxial gas-tube system. It then enters from below into the tubular cracking ovens, thereby flowing around the cracking tubes, and during this process it is cooled down to a moderate temperature. The gas is then transferred underneath the support plates to the interior tubes of the coaxial duct and enters into the steam generators from above. It flows downward on the shell side (around the pipes of the steam generator) where it is further cooled, and subsequently is compressed in the blower systems installed there.

The return flow of the cooling gas from the blowers back to the high-temperature reactor takes place through the exterior pipes of the coaxial gas ducts and coaxially also around the components. To accomplish this, annular passages are installed between the liners of the pods and the components. The gas in each loop is first moved from the blower into an annular passage installed between the steam generator and the pod. Moving upwardly, it flows through the outer coaxial duct into the pod provided for the tubular cracking oven. From there, it passes downwardly into an annular passage between the cracking oven and the liner and it then streams through the outer duct of the coaxial system between the pod in which the tubular cracking oven is installed and the high-temperature reactor. It flows into the reactor cavern, where it them streams upwardly through an annular space between the cavity and the high-temperature reactor, and enters the reactor itself from above.

The sequentially described path of the gas flow from the individual blowers up to the reactor offers the advantage that all the structural parts exposed to high temperature installed inside the pods are surrounded by streams of relatively cool gas, whereby the problems connected with heat-insulation are substantially reduced.

In a preferred embodiment involving a reactor having a thermal output of 2,000 MW, the primary circuit comprises four identical loops, the components of which are installed inside the concrete pressure vessel at a 90° angle relative to each other. The pods in which the four tubular cracking ovens are installed and those in which the four steam generators and the heat exchangers are installed, have been placed in circular patterns having different radii.

All pods are sealed off at the top and bottom by pressure- and gas-tight lids. For the purpose of removing any components, the respective lid is taken off, and after the gas pipes are disconnected, any component can be taken out as a unit, either from above or below, as the case may be.

The tubes connecting the steam generators with the steam turbine assembly, and the tubes which connect the recuperative heat exchangers with the components provided for the gasification of coal are preferably installed so as to pass through the lids, whereby the steam-carrying loops pass through the upper lid, while the recuperative set passes through the lower lid. The mixutre of methane and steam fed into the tubular cracking oven passes through a distributor heat installed above the support place holding the tubular cracking oven and is then distributed over the several cracking tubes. The gas passing through the cracking tubes in a downward direction is cracked by the effect of the heat supply and the catalyst. The cracking gas is brought back through a tube having a smaller diameter than that of the cracking tube in which it is coaxially installed. This smaller tube extends downward into a collector chamber at the lower end of the cracking tubes. The gas is collected in this collector chamber and subsequently passes through the interior tube of the coaxial system to the respective recuperative heat exchanger. The ducts connecting the water or steam sources with the steam generators are designed in a similar manner. The water is first distributed over the various pipes in the steam generator through which it flows centrally in a downward direction, and it subsequently passes from below through the helical tubes of the steam generator. The steam generated is accumulated and eventually blown out of the concrete pressure vessel.

A secondary system for the disposal of heat is suitably provided inside the concrete pressure vessel. In the convention manner, it comprises a blower, a check valve, and a cooler. This emergency cooling system operates independently from the primary circuit and secures the disposal of the reactor's residual fission-generated heat in the event of malfunction and during periods of shut-down of the plant. During normal operation of the nuclear reactor, a small amount of the gas entering the reactor is deflected and flows backwardly through this secondary cooling system. The secondary cooling system has an efficiency factor of 4 × 50% and is installed in four pods symmetrically aligned in a circle around the reactor caver, between the pods comprising the components of the primary circuit. The entire plant therefore comprises sixteen pods. The four pods comprising the secondary cooling circuit are smaller than the pods provided for the tubular cracking ovens and those provided for the steam generators, but larger than the pods in which the recuperative heat exchangers are installed.

Other objects, features and advantages of the invention will become apparent from the following detailed description of preferred embodiments when read together with the attached figures of drawing.

BRIEF DESCRIPTION OF THE DRAWINGS

In the drawings:

FIG. 2 is a partial vertical/sectional view taken along line II— II in FIG. 1, on an enlarged scale.

DETAILED DESCRIPTION OF PREFERRED EMBODIMENTS

Figure 1:
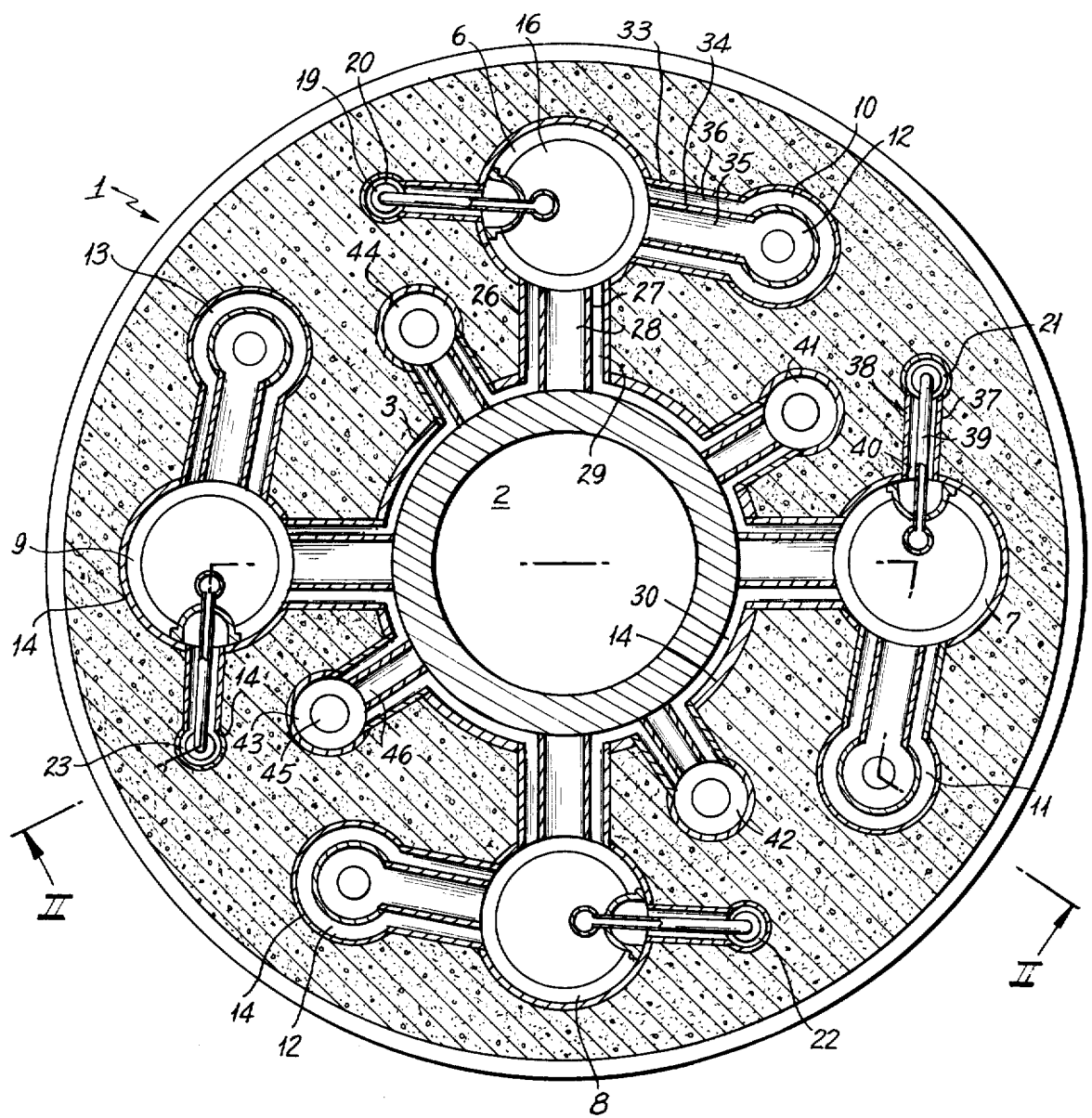
FIG. 1 is a staggered horizontal sectional view according to the invention taken along the line I— I in FIG. 2.

FIGS. 1 and 2 show an explosion-proof, pressure-tight safety vessel 1 of cylindrical shape made of reinforced concrete. Centrally inside the safety vessel are arranged a helium-coated high-temperature reactor 2 having ball-shaped fuel elements, together with the components of the primary circuit (the tubular cracking ovens, steam generators, blowers, gas lines, and the secondary cooling systems) as well as the recuperative heat-exchangers, which shall be further described below.

The high-temperature reactor 2 is built into a cavity 3. Above the reactor cavity is shown a collection chamber 4 in which the cold helium is accumulated prior to being fed into the reactor. Underneath the floor of the reactor core a pillared collection chamber 5 is provided, wherein the exiting helium is accumulated after being heated in the core. The nuclear reactor 2 is connected to the primary circuit by four symmetrically and radially installed inlet and outlet pipes.

In a circle around reactor cavity 3, four perpendicular pods 6, 7, 8, 9 are arranged, spaced symmetrically 90° with respect to each other. Parallel thereto are arranged four additional perpendicular pods 10, 11, 12, 13, likewise spaced symmetrically to each other but on a circle of larger radius (than pods 6, 7, 8, 9) around cavity 3. These large passageways, which like the reactor cavity 3 are encased in heat-insulated and water-cooled steel liners, are capped by explosion-proof lids 15, which are secured with an excess number of fasteners. In a circle of even larger radius, four additional pods 20, 21, 22, 23 are provided, likewise positioned symmetrically at 90° with respect to one another around cavity 3. These pods have a relatively small diameter and are closed on top and at the bottom by explosion-proof lids 24, 25. The pods are likewise lined with heat-insulated steel liners 14.

In each of the four pods 6, 7, 8, 9, a tubular cracking oven 16 is installed on the same level as the reactor core. Each tubular cracking oven 16 is connected to a steam generator 17 installed in pods 10, 11, 12, 13. Underneath each steam generator 17 in pods 10, 11, 12, 13 a blower assembly 18 is installed comprising a single-stage axial blower, as shown in FIG. 2. In each of the pods 20, 21, 22, 23, a recuperative heat exchanger 19 is installed, each of which is connected to one tubular cracking oven 16.

The tubular cracking ovens 16, the steam generators 17, and the recuperative heat exchangers 19 are accessible for removal from the top, while contrariwise, blower assemblies 18 are easily removed from below.

The pods 6, 7, 8, 9 are each connected to reactor cavity 3 by a horizontal passageway 26 in which is installed coaxial gas duct 27, wherein the hot exhaust gas from the reactor streams through the inner coaxial duct 28, and the gas entering the reactor passes through the outer annular conduit 29. Then in the annular space 30 between the high-temperature reactor 2 and the reactor cavity 3 the gas passes to collection chamber 4.

The tubular cracking ovens 16 are each suspended from a support plate 31 which is firmly attached by flanges to liners 14 inside each pod. The joint between the support plates 31 and the liner 14 is tightly sealed, creating the chamber 32 which is completely separated from the tubular cracking oven. Chamber 32 is charged with pure helium gas at a somewhat higher rate of pressure than that of the primary gas.

Horizontal passageways 33 are installed below the support plates 31 of tubular cracking ovens 16; then connect pods 6, 7, 8, 9 with the adjacent pods 10, 11, 12, 13. In passageways 33, coaxial gas tubes 34 are also installed. The gas streams out of the tubular cracking ovens 16 in the inner tubes 35 to the steam generators 17, whereas the relatively cold gas, after being compressed by compressor 18, passes through the outer annular space 36 back to the high-temperature reactor 2.

The entire primary circuit is therefore split up into four identical loops, which are combined via nuclear reactor 2 and each of which comprises a tubular cracking oven 16, a steam generator 17, a blower assembly, and the corresponding system of gas lines.

Above the support plates 31 of each tubular cracking oven 16, a horizontal passageway 37 is provided which connects pods 6, 7, 8, 9 each with respective pods 20, 21, 22, 23. In each passageway 37 a coaxial duct 38 is installed comprising an inner conduit 39 and an outer annular conduit 40, through which the process gas is moved toward the tubular cracking oven 16. The hot cracking gas passes through the inner ducts 39 from the tubular cracking oven 16 to the recuperative heat exchanger 19.

Four additional pods 41, 42, 43, 44 are provided which are symmetrically installed in a circle having a smaller radius than that of pods 6, 7, 8, 9. Pods 41, 42, 43, 44 are installed at 90° angles and serve as receptacles for the secondary cooling system 45 which is not shown in detail. This secondary cooling system 45 is connected to nuclear reactor 2 by a radial, coaxial gas duct 46 and has the capacity of disposing of 50% of the residual fission heat.

The tubes connecting the recuperative heat exchangers 19 to the components for the gasification of coal (not shown) are installed in the lids 25 of pods 20, 21, 22, 23. The methane/steam mixture passes through pipe 47 ihto pods 20, 21, 22, 23. It streams through annular conduit 48 into the space between the liners 14 and the coaxial ducts 51 before passing into the recuperative heat exchangers 19 through which it flows on the shell side. The mixture then passes through the exterior tubes 40 of the coaxial duct 38 to the tubular cracking ovens 16 from where it is brought to a distributor chamber 49 in each loop. Here the mixture is fed into a plurality of cracking tubes which are welded into the support plate 31. The gas, after being cracked, is collected in accumulation chamber 50 from where it passes through the interior tube 39 of the coaxial system 38 into the recuperative heat exchanger 19. The cracking gas is distributed over the tubes of the heat exchangers 19 by distributor heads 59. It flows in downward direction and is then fed through collector heads 60 into the coaxial ducts 51 installed in the lower sections of pods 20, 21, 22, 23. Coaxial ducts 51 subsequently pass out of the concrete pressure vessel 1 through lids 25 and are extended outwardly so as to connect the system with the components for the gasification of coal.

For the purpose of replacing the catalyst contained in the cracking tubes, the chambers 32 above support plates 31 in pods 6, 7, 8, 9 are made easily accessible by means of access passages 52 set into pod covers 15.

The pipes connecting the steam generators 17 with the steam turbine assemblies (now shown) are installed so as to pass through the lids 15 of pods 10, 11, 12, 13. The water supply passes through pipes 53 into the distributors 54 where it is distributed over a plurality of steam-generating tubes. After being vaporized and subsequently superheated in the steam generators 17, the steam is collected in collector chambers 55 from where it passes through pipes 56 to the steam turbine assembly.

In the following, the circuit of the primary gas through the reactor and the circuit of the process gas through one of the tubular cracking ovens is once again summarized, limiting the description to one of the four identical loops.

The cold helium gas is brought into accumulator chamber 4 above the reactor core at a temperature of 420° C and at a pressure of 39.9 bar. It then flows downwardly through the reactor core absorbing heat, and is collected in the pillared collection chamber 5. It is then distributed over the four parallel loops via the four reactor outlet pipes.

The helium gas heated to 930° and at a pressure of 39.2 bar enters, from below, through hot-gas duct 28 into the tubular cracking oven 16 where it is cooled down to a moderate temperature by the process gas moving through the cracking tubes in the opposite direction. The primary gas is brought through the inner coaxial tube 35 of connecting duct 34 to the steam generator 17, entering into it at a temperature of 780° C and at a pressure of 39.1 bar. It flows through it also on the shell side, but from top to bottom. In its passage through steam generator 17, the gas is cooled by the oppositely flowing water being vaporized. The gas streams out of the steam generator 17 at a temperature of 400° C and at a pressure of 38.7 bar and is then compressed by blower 18 to the highest pressure applied in the circuit, 40 bar, whereas its temperature is now 410° C.

The gas is returned from the blower 18 to the nuclear reactor through the exterior tubes of the coaxial pipes and on its path flows around all the components comprising the primary circuit, including the hot-gass pipes. The relatively cold gas passing out of blower 18 moves through the annular duct 57 installed in the space between the steam generator 17 and the steel liner 14 in an upward direction in its pod. The gas is brought into pods 6, 7, 8, 9 through the outer tube 36 of the coaxial duct 34 which connects each of pods 6, 7, 8, 9 to its respective counterpart, 10, 11, 12, 13. The gas then moves downwardly through the annular conduit 58 formed by the space between the tubular cracking oven 16 and the steel liner 14 in each pod, and then enters into the reactor cavity by way of the exterior annular conduit 29 in the horizontal passageway 26. Subsequently the helium gas passes through the annular space 30 between the high-temperature reactor 2 and reactor cavity 3 to accumulation chamber 4.

In the recuperative heat exchangers 19, the methane/steam mixture is heated to 650° C and then brought to the tubular cracking ovens 16 at this temperature and at a pressure of 43 bar. The gas, after being cracked, emerges, having the temperature of 820° C and a pressure of 40 bar. In passing through the heat exchanger 19 the cracking gas gives off some of its heat to the methane/steam mixture and moves out of the heat exchangers at a temperature of approximately 520° C.

The temperature of the water supply fed into the steam generators is 170° C, while the temprature of the live steam is 510° C.

The chamber 32 above the support plate 31 in all the tubular cracking ovens 16 is filled with pure helium at a pressure of 41 bar.

What is claimed is:

1. A plant for the production of hydrogen through utilization of heat energy derived from a gas-cooled, high-temperature nuclear reactor, comprising:
   a. a thick-walled vessel;
   b. a high temperature reactor contained in a centrally oriented cavity with said vessel;
   c. a plurality of process gas cracking reactors contained within the wall of said vessel;
   d. a plurality of steam generators equal to the number of said gas cracking reactors, said generators being contained in the wall of said vessel;
   e. a plurality of recuperative heat exchangers equal to the number of said gas cracking reactors each of said heat exchangers being contained within the wall of said vessel and being positioned closely adjacent one of said gas cracking reactors;

f. a coaxial conduit connecting said adjacent heat exchanger and gas cracking reactor pairs; and g. a coaxial conduit connecting said gas cracking reactor and steam generator pairs; whereby said coaxial donduits transport cooling gas through the exterior space therein.

2. The plant as defined in claim 1, further comprising a conduit extending from each of said recuperative hat exchangers outwardly through the base of said pressure vessel.

3. The plant as defined in claim 1, wherein said gas cracking rectors are tubular cracking ovens.

4. The plant as defined in claim 3, wherein said tubular cracking ovens, said steam generators and said recuperative heat exchangers are each symmetrically and removably installed in pods surrounding said high temperature reactor cavity, further comprising a blower installed underneath each steam generator.

5. The plant as defined in claim 4, comprising a plurality of identical primary cooling gas circuits, each of which comprises, in series, one of said tubular cracking ovens, one of said steam generators, and one of said blowers and interconnective conduit means for conveying cooling gas, between said circuit components.

6. The plant as defined in claim 5, comprising horizontal, linear conduit means for transporting cooling gas and process gas between all components of said circuits and for transporting cooling gas between the tubular cracking ovens and the high temperature reactor cavity.

7. The plant as defined in claim 4, wherein an annular passageway for the passage of gas is formed between each of said tubular cracking ovens and the wall of the pod containing it and between each of said steam generators and the wall of the pod containing it.

8. The plant as defined in claim 5, wherein four tubular cracking ovens are provided installed at 90° angles with respect to one another.

9. The plant as defined in claim 4, wherein said pods comprise, at the top and at the base, pressure- and gastight sealing lids.

10. The plant as defined in claim 8, comprising conduit means extending to outside of said vessel through the top lid of the pods containing said steam generators and the base lid of the pods containing said recuperative heat exchangers.

11. The plant as defined in claim 1, comprising further a secondary cooling system installed inside said pressure vessel, said cooling system comprising a blower and a cooler, and said secondary cooling system being contained in a plurality of pods symmetrically placed around the reactor cavity.

* * * * *